United States Patent [19]

Knepper

[11] 4,391,623
[45] Jul. 5, 1983

[54] METHOD FOR MAKING OF SOLID FERTILIZER BY SEPARATION OF LIQUID MANURE AND DEVICE FOR CARRYING OUT THIS METHOD

[75] Inventor: Hermann Knepper, Olfen, Fed. Rep. of Germany

[73] Assignee: Heinrich Bernhard Brinkmann, Bergkamen-Overberge, Fed. Rep. of Germany

[21] Appl. No.: 257,403

[22] Filed: Apr. 24, 1981

[30] Foreign Application Priority Data

Nov. 22, 1980 [DE] Fed. Rep. of Germany ....... 3044022

[51] Int. Cl.³ ........................... C05F 3/00; C05F 3/06
[52] U.S. Cl. ..................................... 71/21; 210/114; 210/609
[58] Field of Search ....................... 210/112, 114, 609; 71/8–10, 12, 13, 15, 21

[56] References Cited

U.S. PATENT DOCUMENTS 3,504,795 4/1970 Johnson .................... 210/114 X

FOREIGN PATENT DOCUMENTS 2415067 10/1975 Fed. Rep. of Germany ............ 71/9

Primary Examiner—Ferris H. Lander
Attorney, Agent, or Firm—Michael J. Striker

[57] ABSTRACT

Method for making of solid fertilizer by separation of liquid manure into a solid and a liquid phase by means of a separating vessel, wherein the charged liquid manure at first is divided into a solid layer and into a liquid phase and from where the liquid phase is fed into a collector vessel, and whereby the solid phase is separated. The duration time of the liquid manure in its resting stage is delayed until the layer formed by the solid phase is separated on the top of the vessel and then the discharge of the liquid phase is carried out through closeable openings.

5 Claims, 5 Drawing Figures

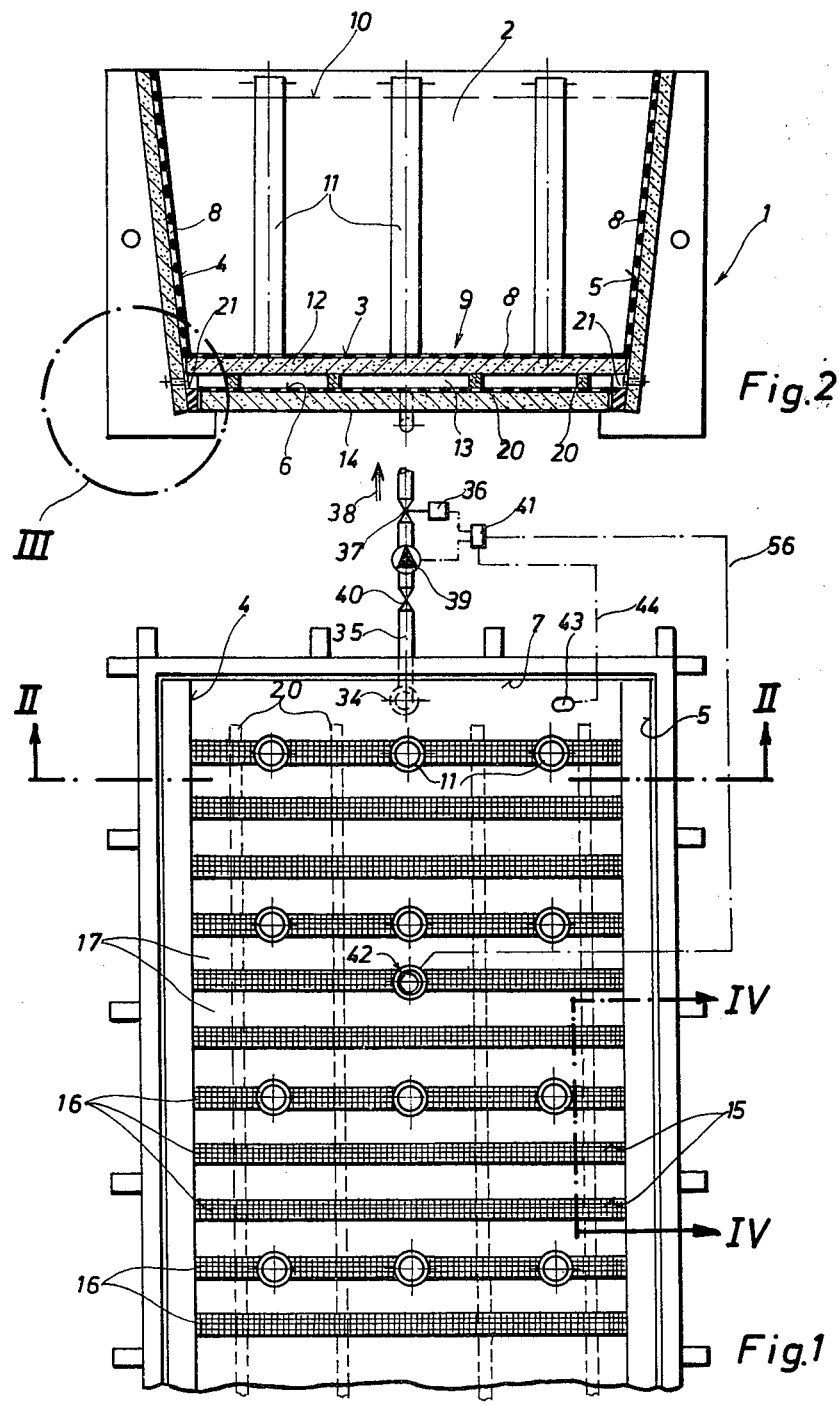

METHOD FOR MAKING OF SOLID FERTILIZER BY SEPARATION OF LIQUID MANURE AND DEVICE FOR CARRYING OUT THIS METHOD

BACKGROUND OF THE INVENTION

The invention relates to a method of making a solid fertilizer by separation of liquid manure into a solid and a liquid phase by means of a filter vessel into which the liquid manure is charged and left therein in a resting stage until a solid layer is separated on the top and a liquid phase therebelow, and thereafter the liquid phase is discharged by opening at least one closeable discharge opening (in accordance with the German patent application No. P 29 43 962.1-23).

This method in accordance with the above patent application is characterized with respect to comparable methods, in particular that in a time and cost saving manner the liquid phase is separated from the solid phase of the liquid manure by a modified discharging of the liquid phase in a time controllable filter process, whereby basically no complicated structure not operating costs involving excessive oil, gas or electricity consumption are required.

SUMMARY OF THE INVENTION

It has now been found that the aforementioned method in accordance with the application No. 29 43 962.1-23 can be controlled in a shorter time and therefore more economically and without personnel assistance, when in accordance with the subject additional invention, the bottom of the filter vessel is immersed into a liquid, thereafter the liquid manure is introduced and after the separation of the solid phase, the liquid phase is discharged to such an extent that the solid phase has almost reached the bottom of the filter vessel, and that the discharge of the liquid phase is then interrupted and again a renewed separation of the solid phase on top and the liquid phase therebelow is waited for, and the discharge is again opened.

Since in accordance with the above application the bottom of the filter vessel must be travelled on by an agricultural vehicle, for example, a tractor for emptying the solid phase, the danger exists that the openings of the filter vessel may be clogged by stuck particles of the solid phase. This is eliminated in that the bottom of the filter vessel is immersed into a liquid before introducing the liquid manure, so that the solid particles are either softened in the filter openings or are discharged. Furthermore, in this manner it is eliminated that during the introduction of the liquid manure solid components can enter the filter openings before the separating process is initiated. Therefore, a covering of these filter openings is not required any longer, after the introduction of a liquid to the bottom of the filter vessel.

Furthermore, it had been found that after the first separation process and after the discharging of the liquid phase, the drying process can be accelerated in that a further separation is waited for, the liquid phase will again be discharged to an extent at which the solid phase has almost reached the bottom of the filter vessel and then the discharge of the liquid phase is interrupted. If this performed process is separated three to four times in this manner, the drying process can be considerably reduced.

This stepwise discharge of the liquid phase is repeated in accordance with the invention until no mentionable separation process of liquid and solid phase occurs any longer. Only after the last separation process all available discharge openings of the filter vessel are opened and the remaining solid phase in the filter vessel is aired by natural convection from the bottom of the filter vessel. This natural convection can be performed in the manner described in the above mentioned application.

In addition, this method has the advantage that the device for carrying out the method can be simplified. The basis for this is that the device includes of a concrete filter vessel with a filter plate and openings for flow through which are provided therein, as well as with an impermeable lower plate therebelow leaving an intermediary space which is provided with a surface inclination in direction of at least one discharge opening. The simplification is obtained in that the filter plate is designed as a slotted bottom, the slot of which is covered by a mesh grating. Since this slotted bottom is now closed by a "liquid plug", for example, by water or the liquid phase of the liquid manure in accordance with the novel inventive method, cover foils, or the like, are not required any longer. Furthermore, the slotted bottom assures a rapid discharging of the liquid phase in the space between the filter plate and the lower plate. Even if the openings of the mesh gratings are covered by a tractor travelling thereon, they can again be opened before the next filling process by the liquid which reaches the upper edge of the bottom. This is particularly true when before the introduction of the liquid manure water is introduced to at least the upper edge of the bottom from beneath through the bottom of the filter vessel.

A simple and extremely sturdy filter plate is obtained in that the slotted bottom is formed by concrete slabs having a trapezoidal cross section which slabs have a conical shape in the direction of the lower plate and have recesses at the sides facing the inner space of the vessel into which the mesh gratings are mounted flush with respect to the upper edge. Thereby, the concrete slabs are mounted on mounting supports disposed transverse to their longitudinal direction and are supported at both ends on foundation of the vessel walls, whereby again the latter have an extreme stable support.

Advantageously, the lower plate as well as all joints between the plate and the vessel walls are sealed with a material which is resistant against corrosive liquids. In order to close the intermediary space between the filter plate and the lower plate by penetrating of the "liquid plug" formed by the water, on the one hand, and to permit a rapid opening during the convective airing, on the other hand, the vessel walls are provided with a plurality of openings between the filter plate and the lower plate which are closeable by plugs actuated from outside and are water pressure tight on the inside of the vessel. These plugs may consist, for example, of two plates which are connected with each other by means of a rod having a slot, whereby the one plate is pulled sealingly against the opening in the vessel wall when driving a wedge into the slot of the rod.

In order to operate the novel filter method free of delays as well as without the assistance of operating personnel, the discharge opening discharges into a discharge line and into the discharge opening in the lower plate, and a valve is provided therein which can be opened and closed by a servo motor and a feeding pump is provided in the throughflow direction in front of the valve. Thereby, the operation of the servo motor and the feeding pump is advantageously controlled by a control device, which in turn is controllable by a level switch and a control pipe.

Advantageously, the level switch consists of an heightwise controllable swimmer switch which can be placed with its lower edge on the liquid manure level, after the liquid manure has been introduced. Because after the solid phase separates from the liquid phase a fermenting process of the top floating solid phase occurs. This fermenting process is coupled with a level rise of the surface of the solid phase. As soon as this level rise amounts to 4 cm to 5 cm, the liquid phase beneath does separate to such an extent that it can be drawn off. At this point in time, the swimmer switch has been flipped into a different position by the upper layer of the solid phase, for example, from a suspended perpendicular position into a horizontal position, whereby the contacts of the swimmer switch are closed and the control device receives the order to open the valve and to switch on the feeding pump.

However, in accordance with the inventive method, the discharge of the liquid phase should be interrupted as soon as the solid phase almost reaches the bottom of the filter vessel. This method step is performed by the control pipe. This control pipe consists of a plastic pipe which is open on both ends and is placed stationary on a bottom opening, for example, a mesh grating and protrudes with its upper end above the highest possible liquid manure level and has a closed wall at which in the proximity of the filter plate as well as in a distance (A) thereabove a magnet switch is provided which is actuated by a freely movable iron containing floating ball. Due to this design, the plastic pipe forms a communication container to the remainder of the filter vessel. Since the lower end of this plastic pipe is disposed above a bottom opening and the upper end protrudes from the upper level of the highest possible liquid manure level, the inner space of this control pipe can fill only exclusively from below with a liquid phase. That in return means, that the static pressure of the liquid column which is present therein corresponds to the static pressure of the filter vessel content which consists of solid and liquid phase. When, in accordance with the invention, the liquid phase in the filter vessel is moved by opening the valve and switching on the feeding pump in the discharge line, the liquid level in the control pipe is necessarily lowered and thereby the iron containing ball floating thereon which advantageously has a corrosive resistant layer.

As soon as the liquid level in the control pipe approaches the proximity of the filter plate, the steel sheet metal ball floating thereon actuates the magnet switch which is advantageously mounted in the wall of the plastic pipe, which in return shuts off the feeding pump through the control device and causes the servo motor to close the valve.

Thereafter, in accordance with the invention, a renewed separation of the solid phase on top and the liquid phase therebelow is waited for. This separation process is noticeable in the control pipe by an increase in the liquid level. The steel sheet metal ball which floats thereupon rises together with the liquid level. As soon as the liquid level reaches a certain height above the bottom of the filter vessel, the floating ball contacts a further magnet switch which again causes the servo motor to open the valve and subsequently to switch on the feeding pump through the control device. Since at this point in time the swimmer switch, which triggers the filter process, is again suspended in a perpendicular position due to the lowered level of the liquid phase and that thereby its contacts are interrupted, a switch interference with respect to the magnet switch cannot occur. However, it is essential that during the charging of the liquid manure level and the beginning of the separation process, the swimmer switch triggers the first opening of the valve and the first switching on of the feeding pump through the control device prior to the magnet switches.

In order to be able to individually adjust the initiating of the discharge and interruption process of the liquid phase, which can be very different depending on the type of liquid manure, the distance of the magnet switches from the filter plate as well as from each other is adjustable, in accordance with a further especially advantageous embodiment of the invention.

Only after the last discharge of the liquid phase from filter pipes which are disposed on the mesh gratings, the plugs in the vessel wall, which are actuated from the outside, have to be operated, so as to initiate the intensive airing of the remaining solid phase in the filter vessel as described in the above mentioned application.

It should be noted that the filter pipes known from the above application would basically not be required any longer, however it is known that they considerably accelerate the convection airing and thereby the drying process in the solid phase.

The inventive method is described in the following in conjunction with a novel filter vessel arrangement and the control device thereof as shown in the drawings.

BRIEF DESCRIPTION OF THE DRAWINGS

FIG. 1 is the partial plan view onto the novel filter vessel in empty condition;

FIG. 2 is a section along line II/II of FIG. 1;

DETAILED DESCRIPTION OF THE PREFERRED EMBODIMENTS

Figure 3:
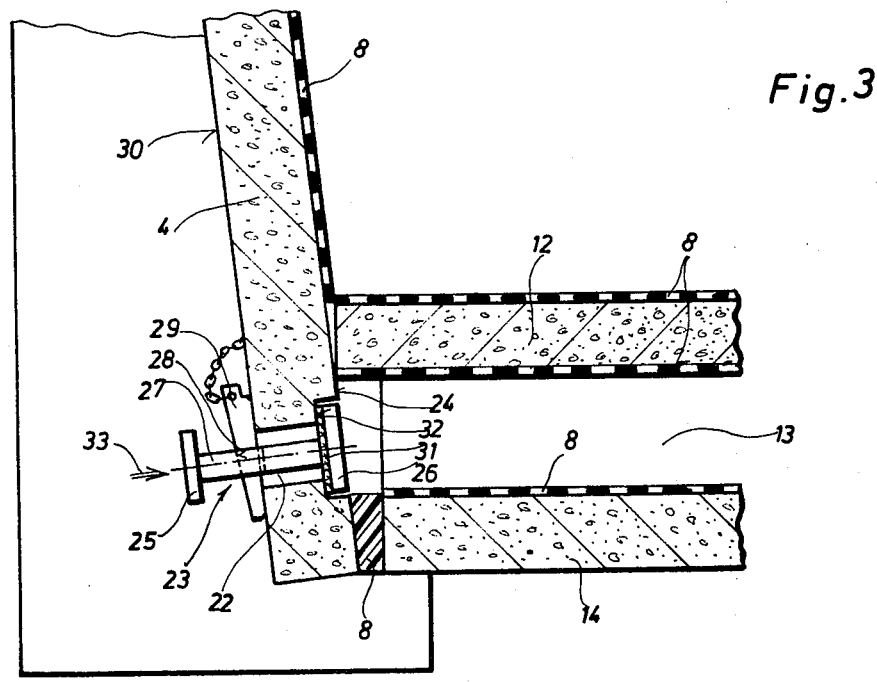
FIG. 3 shows a sectional embodiment of III of FIG. 2.

The novel filter vessel 1 for carrying out the method which will be described later consists, in accordance with FIGS. 1 and 2 essentially of a concrete vessel 1, which can be travelled on, whose faces 3 to 7 which come into contact with the liquid manure 2 are provided with a layer 8 which is resistant against corrosive liquids and in whose bottom 9 a plurality of vertical filter pipes 11 are provided which protrude over the highest possible liquid manure level 10.

Figure 4:
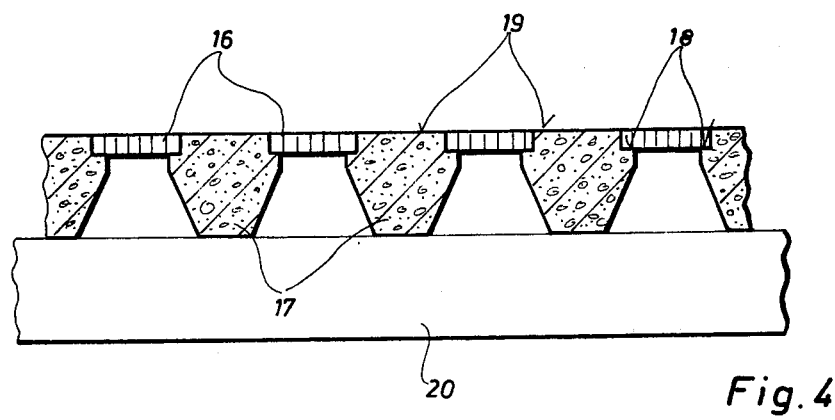
FIG. 4 is a enlargement in accordance with sectional line IV/IV of FIG. 1.

The bottom 9 of the filter vessel 1 is formed by a filter plate 12 and an impermeable lower plate 14 therebelow, leaving an intermediary space 13. The filter plate 12 is formed as a slotted bottom whose slots 15 (see FIG. 2) are covered by mesh gratings 16. The filter plate 12 which is formed as a slotted plate is also formed by concrete slabs 17 which have a trapezoidal cross section which slabs have a conical shape in the direction of the lower plate 14 and have recesses 18 at the sides facing the inner space of the vessel (see FIG. 4), wherein the mesh gratings 16 are mounted flush with respect to the upper edge 19.

The concrete slabs 17 are mounted on mounting supports 20 which are disposed traverse with respect to the longitudinal direction of the concrete slabs, and are also mounted with both ends on foundations 21 of vessel walls 4,5. The lower plate 14, as well as all points between the plate and the vessel walls 4,5,7 are sealed with the material 8 which is resistant against corrosive liquids.

As can be seen, in particular from FIG. 3 in conjunction with FIG. 2, the vessel walls 4,5,7 are provided with a plurality of openings 22 between the filter plate 12 and the lower plate 14 which are closeable water pressure tight on the inner side 24 of the filter vessel by means of plugs 23 which are actuated from the outside. In the shown case, the plugs 23 consist of two plates 25, 26 which are connected with a rod 27. Rod 27 is provided with a slot 28 through which a wedge 29 can be driven from the outer wall 30 of the filter vessel 1, whereby the plate 26, which is provided with a flexible support plate 31, engages snugly against protrusions 32 and thereby seals the opening 22 water pressure tight. For opening, the wedge 29 is pushed out from below with a hammer knocking it in the direction of arrow 33 against plate 25 and thereby pushing it from its locked position into the opening position. Thereby, the path of the plate 25 is larger than that of opening 22, so that the plug 23 cannot get into the intermediary space 13 between filter plate 12 and lower plate 14.

Figure 5:
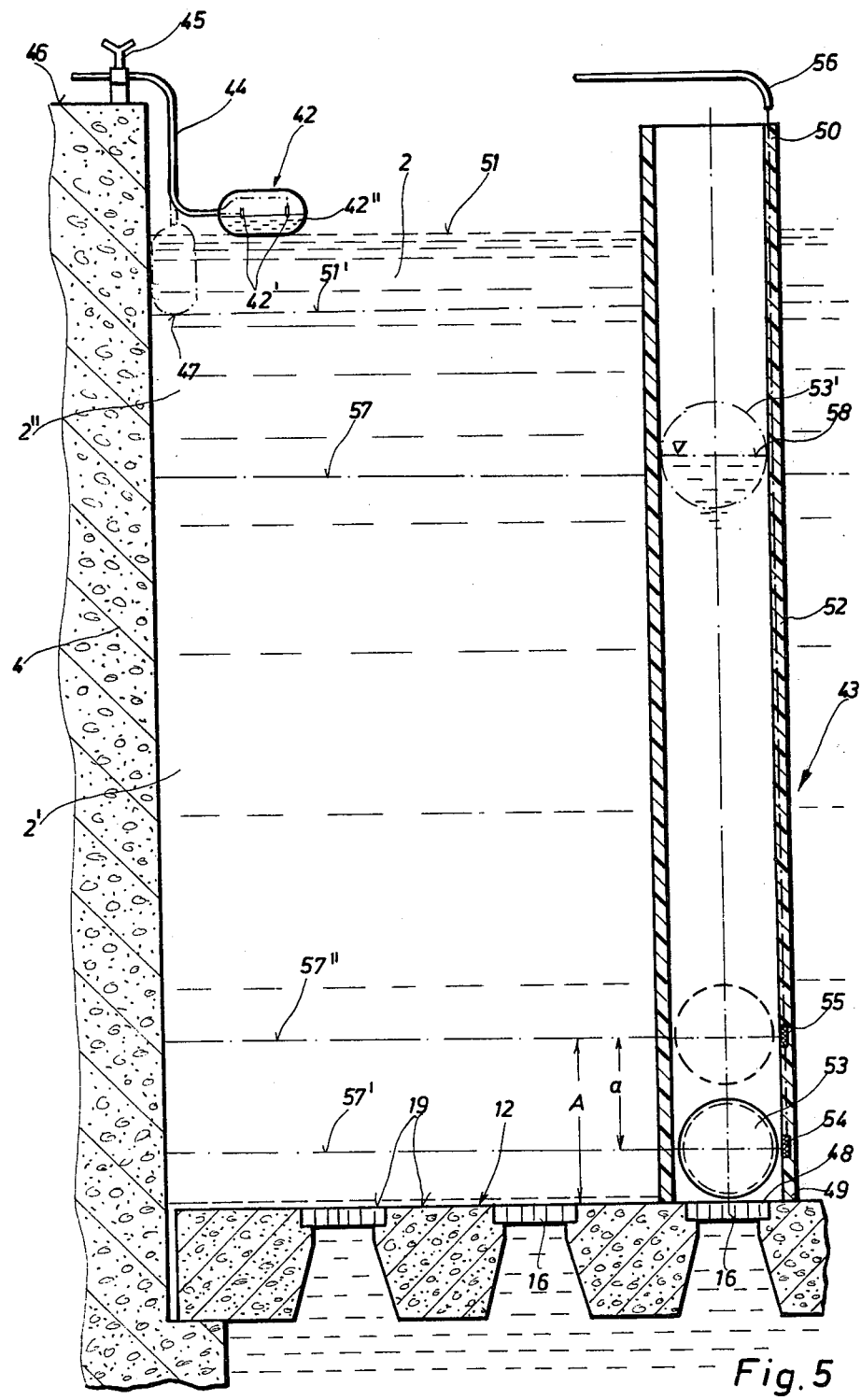
FIG. 5 is a sectional view through the control pipe and a partial view through the vessel with the swimmer switch.

As can be seen from FIGS. 1 and 2, a discharge line 35 discharges into the discharge opening 34 towards which the lower plate 14 is inclined; a valve 37 is disposed in the discharge line which can be opened and closed by a servo motor 36. Furthermore, in the through flow direction of arrow 38 in front of valve 37 a feeding pump 39 is provided, and in front of this a further valve 40 for an eventual required addition of pump 39. Basically, pump 39 is not required for carrying out the inventive method, however it supports a rapid discharging of the liquid phase and thereby also shortens the drying process of the filter process. The operation of the servo motor 36 and the feeding pump 39 are defined by a control device 41 which in return is controllable by a level switch 42 and a control pipe 43, as can be seen in FIG. 5. In the subject case, this level switch 42 consists of a liquid tight encapsulated swimmer switch 42 whose liquid tight connecting line 44 can be suspended for a heightwise adjustment in the inner space of the vessel with its lower edge 47 by means of a simple clamping device 45, for example, a stationary screw clamp mounted on the upper edge 46 of vessel wall 4.

The control pipe 43 consists of a plastic pipe 52 which is open on both ends 49,50 and is placed stationary on a bottom opening, for example, a mesh grating 16 and protrudes with its upper end 50 above the highest possible liquid manure level 51 and has a closed wall at which in the proximity of the filter plate 12 as well as at a distance (A) thereabove magnet switches 54,55 are provided which is actuated by a freely movable iron containing floating ball 53. The magnet switches 54,55 are encapsulated in a liquid tight manner in the wall of pipe 52 and are disposed therein as well as the connecting line 56 which extends from the upper end 50 of control pipe 43 and is connected with the control device 41. The floating ball 53 advantageously has a rust proof layer or another steel sheet metal which is protected against corrosion.

The swimmer switch 42 is actuated through the control device 36 prior to the magnet switch 55 for a first time opening of valve 37 through servo motor 36 and for a first time switching on of pump 39. The magnet switch 54 which is closest to the filter plate 12 closes the valve 37 and simultaneously shuts off pump 39 by means of control device 36. The magnet switch 55 which is positioned at the distance A above filter plate 12 again opens valve 37 and switches on pump 39 through servo motor 36. The distance A of magnet switch 55 from filter plate 12 as well as the distance a of the magnet switches 54,55 between each other is advantageously adjustable, so that they are adjustable to the given liquid manure and the desired filter time.

The inventive method is carried out as follows:

The openings 22 which are provided at different locations in the vessel walls, shown in FIG. 2 in conjunction with FIG. 3, are closed by outside actuated plugs 3 by means of wedges 29 as described. Thereafter, the total intermediary space including the mesh gratings 16 is immersed into a liquid, for example, water through a line (not shown) from below and up to at least the upper edge 19 (see FIG. 4). Thereafter, the liquid manure is introduced from above into the filler vessel 1. Since the water which had been introduced from below at least to the upper edge 19 forms a "liquid plug" the discharge of which is prevented by the closing of valve 37, the liquid manure 2 which is introduced from above cannot clog the mesh gratings 16 with their solid components.

After introducing the liquid manure 2, its level should fill the vessel to the dash-dotted line 51' of FIG. 5. Thereafter, the swimmer switch 42 is suspended into the vessel by means of the clamping device 45 to such an extent that its lower edge 47 engages the line 51' of liquid manure 2. As soon as the solid phase has separated above the lower liquid phase in filter vessel 1, the fermenting process of the solid phase starts. This feeding process is coupled with a yeast like lifting of level 51' of the solid phase to the level 51, which may be a few centimeters, for example. This results in that the swimmer switch 42 is transferred from the perpendicular position shown in the dash dotted lines of FIG. 5 into the straight drawn horizontal position. When reaching the horizontal position, that is, when the swimmer switch 42 thereof tilts, the contacts 42' are closed by a mercury quantity 42'' contained therein, for example, and an electric pulse is given through the line 44 of control device 41 which in turn orders the servo motor 36 to open valve 37 and to switch on the pump 39. At this moment the water and thereafter the separated liquid phase of the liquid manure 2 is discharged through line 35 and fed into a collective vessel, not shown.

As soon as the lower portion of the solid phase has been lowered into the proximity of filter plate 12, valve 37 must again be closed and pump 39 must be shut off, so as to avoid a further lowering. This is performed by the control pipe 43. It is alleged that at the start of discharging liquid from the liquid manure 2 the static pressure in the control pipe 43 is such that the liquid level finishes only somewhat above the liquid line of the liquid phase in control pipe 43. The separation line between the liquid phase 2' and the solid phase 2'' of the liquid manure 2 is shown in FIG. 5 at this moment by the dash dotted line 57. In this case the liquid level in control pipe 43 should be at the dash dotted line level 58 (or above), so that at this time the swimmer ball 53 assumes the dash dotted line 53'. During the lowering of level 57 of liquid phase 2', the liquid level 58 in the control pipe 43 is lowered correspondingly and thereby also the floating ball 53 which floats thereon. As soon as the floating ball 53 passes the magnet switch 54 an electric pulse is sent through line 56 (FIG. 1) to control device 41 which again causes a switching off of pump 39 and a closing of valve 37. Since during this process the swimmer switch 42 again assumes its suspended position as indicated with dash dotted lines in FIG. 5, thus separating the contents from each other, a holding relais is required in the control device 41 after a first switching operation which prevents the established contact to be interrupted at least until the lowering of the floating ball 53 to the magnet switch 54.

After the liquid level 57 has been lowered to about the level 57' and the floating ball 53 has shut off pump 39 and closed valve 37 through the magnet switch 54, the liquid manure again begins to separate, that is, a solid upper phase and a lower liquid phase is formed. Accordingly, the liquid level of level 57' in control pipe 43 rises to the level 57", for example. However, a rising of the liquid level is simultaneously coupled with a rising of the ball 53 floating thereon. As soon as the same passes the magnet switch 55 in upward direction on electric pulse is again sent through the line 56 to the control device 41, which in turn again opens valve 37 and thereafter switches on pump 39 through servo motor 36. When lowereing the liquid level 57" to the level 57', the magnet switch 54 is again actuated by the floating ball 53 passing the magnet, thus again switching off the pump 39 and closing valve 37. This process is repeated three or four times, for example, depending on the type of liquid manure. For this purpose the valve 37 is opened by shutting off the control device 41 and the pump 39 is left in switched off operating position. As soon as the liquid is discharged from the intermediary space 13 between filter plate 12 and lower plate 14, the filter pipes 11, shown in FIG. 2, are opened so that the liquid in the center of the solid phase can discharge. Also, the openings 22 are opened by a corresponding actuation of the closing plugs 23. Thereby, atmospheric outer air can enter through openings 22 into the intermediary space 13 and from there flow convectively through the mesh gratings 16 upwardly through the solid phase of the liquid manure 2, so that the same is subjected to a rapid remaining drying.

After the remaining drying, one side of the filter vessel is removed, for example, the filter vessel wall 7, or the same is layed down, the filter pipes 11 as well as the control pipe 43 are removed, so that a tractor can travel on the bottom 9 of the filter plate 12 for removing the solid and dried phase. Thereby, it is unavoidable that components of the solid phase are pushed into the mesh gratings 16. However, this is unimportant insofar as these components are softened or flushed out upwardly by the water which is introduced in the intermediary space 13 up to the upper edge 19 (see FIGS. 3 and 4) (liquid plug), before the renewed filling of the filter vessel 1 with liquid manure 2.

I claim:

1. In a method of making a solid fertilizer by separation of liquid manure into a solid phase and a liquid phase by means of a filter vessel into which the liquid manure is charged, said filter vessel having a bottom and a top and at least one closeable discharge opening, the improvement comprising the steps of immersing the bottom of the filter vessel into a liquid; then introducing the liquid manure into the filter vessel and leaving the liquid manure in said vessel in a resting stage until a solid phase of the manure is collected on the top of the filter vessel and the liquid phase is collected therebelow; discharging the liquid phase from the vessel to such an extent that the solid phase almost reaches the bottom of the filter vessel; interrupting said discharging step and waiting for a renewed separation of the solid phase from the liquid phase and for collecting the solid phase on the top of the vessel and the liquid phase therebelow; and discharging a liquid phase of the manure newly collected in the filter vessel.

2. The method in accordance with claim 1, the bottom of the vessel having an upper edge, said liquid being water which is fed into the filter vessel before introducing the liquid manure to at least the upper edge of said bottom.

3. The method in accordance with claim 2, wherein water is fed from below through the bottom of the filter vessel.

4. The method in accordance with claim 3, wherein said step of discharging a liquid phase of the manure is repeated until no mentionable separation of the liquid phase from the solid phase occurs in said vessel.

5. The method in accordance with claim 3, wherein after a separation process is completed and the liquid phase is totally discharged from the vessel said discharge opening is opened and a solid phase remaining in the vessel is aired by natural convection provided through the bottom of the filter vessel.

* * * * *